US012567698B2

(12) United States Patent
Deloche et al.

(10) Patent No.: US 12,567,698 B2
(45) Date of Patent: Mar. 3, 2026

(54) ELECTRICAL CONNECTORS CONFIGURED FOR POSITIONING ON, AT, IN, OR NEAR BODIES OF AUTOMATIC SWIMMING POOL CLEANERS

(71) Applicant: ZODIAC POOL CARE EUROPE, Belberaud (FR)

(72) Inventors: Remi Deloche, Toulouse (FR); Louis Favie, Colomiers (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 521 days.

(21) Appl. No.: 17/831,186

(22) Filed: Jun. 2, 2022

(65) Prior Publication Data

US 2022/0393389 A1 Dec. 8, 2022

Related U.S. Application Data

(60) Provisional application No. 63/196,322, filed on Jun. 3, 2021.

(51) Int. Cl.
*H01R 13/523* (2006.01)
*E04H 4/16* (2006.01)
(Continued)

(52) U.S. Cl.
CPC ......... *H01R 13/523* (2013.01); *E04H 4/1654* (2013.01); *H01R 13/5213* (2013.01); *H01R 13/5219* (2013.01); *H01R 13/58* (2013.01)

(58) Field of Classification Search
CPC .............. H01R 13/523; H01R 13/5213; H01R 13/5219; H01R 13/58; H01R 13/5825; H01R 24/58; E04H 4/1654
See application file for complete search history.

(56) References Cited

U.S. PATENT DOCUMENTS 6,412,133 B1 * 7/2002 Erlich .................. E04H 4/1663 15/1.7
7,337,803 B2 * 3/2008 van der Meijden .. E04H 4/1663 251/356
(Continued)

FOREIGN PATENT DOCUMENTS

| | | |
|---|---|---|
| CN | 201358597 | 12/2009 |
| WO | 2004015223 | 2/2004 |
| WO | 2014159955 | 10/2014 |

OTHER PUBLICATIONS

International Application No. PCT/IB2022/055171, International Preliminary Report on Patentability, mailed on Dec. 14, 2023, 8 pages.
(Continued)

*Primary Examiner* — Abdullah A Riyami
*Assistant Examiner* — Nelson R. Burgos-Guntin
(74) *Attorney, Agent, or Firm* — Kilpatrick Townsend & Stockton LLP

(57) ABSTRACT

Electrical connectors for automatic swimming pool cleaners (APCs) are described. The connectors may be positioned on, at, in, or near bodies of the APCs and configured to be submerged in water of swimming pools. They additionally may be designed to withstand mechanical pulling stresses when their associated electrical cables are pulled by users to remove APCs from the pools. If such a connector is separable, essentially the entirety of the electrical cable may be separated from the APC for purposes of untangling or storing the cable, as examples. The separation additionally may allow for insertion of one or more extension cables as needed or desired.

17 Claims, 5 Drawing Sheets

(51) Int. Cl.

| | |
|---|---|
| ***H01R 13/52*** | (2006.01) |
| ***H01R 13/58*** | (2006.01) |

(56) References Cited

U.S. PATENT DOCUMENTS

| | | | | |
|---|---|---|---|---|
| 9,716,338 | B2 | 7/2017 | Brown | |
| 2007/0144602 | A1* | 6/2007 | Henkin | E04H 4/1654 138/119 |
| 2008/0311789 | A1* | 12/2008 | Burris | H01R 24/40 439/578 |
| 2013/0104321 | A1* | 5/2013 | Michelon | E04H 4/1654 15/1.7 |
| 2013/0110319 | A1* | 5/2013 | Michelon | E04H 4/1654 701/2 |
| 2014/0273541 | A1* | 9/2014 | Renaud | E04H 4/1672 439/13 |
| 2020/0056391 | A1* | 2/2020 | Lancry | B25J 11/0085 |
| 2022/0393389 | A1* | 12/2022 | Deloche | H01R 13/5219 |
| 2024/0068258 | A1* | 2/2024 | Besnier | E04H 4/1654 |
| 2024/0271448 | A1* | 8/2024 | Lacombe | H01R 35/04 |

OTHER PUBLICATIONS

International Application No. PCT/IB2022/055171, International Search Report and Written Opinion mailed on Aug. 4, 2022, 12 pages.

* cited by examiner

ELECTRICAL CONNECTORS CONFIGURED FOR POSITIONING ON, AT, IN, OR NEAR BODIES OF AUTOMATIC SWIMMING POOL CLEANERS

REFERENCE TO RELATED APPLICATION

This application claims the benefit of U.S. Provisional Patent Application No. 63/196,322, filed on Jun. 3, 2021 and entitled ELECTRICAL CONNECTORS CONFIGURED FOR POSITIONING ON, AT, IN, OR NEAR BODIES OF AUTOMATIC SWIMMING POOL CLEANERS, the content of which is hereby incorporated by reference in its entirety.

FIELD OF THE INVENTION

This invention relates to equipment, systems, and methods for providing electrical power to devices intended to operate underwater and more particularly, although not necessarily exclusively, to submergible electrical connectors configured to be positioned on, at, in, or near bodies of automatic swimming pool cleaners (APCs).

BACKGROUND OF THE INVENTION

Numerous cleaning devices capable of autonomous movement within swimming pools and spas currently exist. The most common of these devices are APCs, which often are either hydraulic or robotic in type. Hydraulic cleaners vary water flow for movement, while robotic cleaners typically employ electric motors to cause motion. Hydraulic APCs, furthermore, subdivide into "pressure-side" and "suction-side" cleaners, with pressure-side cleaners being fluidly connected to outputs of pumps of pool water circulation systems and suction-side cleaners being fluidly connected to inputs of such pumps.

Robotic APCs require a source of electrical power to operate (at least) their electric motors. Although some cordless robotic APCs include on-board batteries, other APCs do not. Instead, electrical cables extending into water of swimming pools typically connect the APCs to power sources.

In these cases, care obviously must be taken to mitigate the adverse electrical effects of pool water intrusion into the cables. Such cables additionally may be subject to mechanical stresses caused both by movements of the APCs within pools and by users pulling on the cables as convenient methods to retrieve APCs and remove them from pools. To alleviate these concerns in part, swivel connectors have been developed for connection to the cables.

One existing connector is disclosed in U.S. Pat. No. 9,716,338 to Brown. As with many of these connectors, the connector of the Brown patent is described as being waterproof but is not necessarily designed to be submerged within water of a swimming pool. Rather, the connector of the Brown patent arguably is intended to be placed at or near an electrical power source located externally of a pool, as is conventional. Alternatively, even if intended to be submerged, the connector of the Brown patent is illustrated as being separated from an APC by a segment of electrical cable. See Brown, FIG. 1. The entire contents of the Brown patent are incorporated herein by this reference.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, an electrical connector may be positioned on, at, in, or near a body of an APC.

According to some embodiments, an APC includes a body and an electrical connector positioned on, at, in, or near the body.

According to various embodiments, a cable assembly for an APC includes an electrical connector positioned on, at, in, or near a body of the APC.

According to some embodiments, an electrical connector for a robotic APC is configured to (i) be submerged in use and (ii) withstand mechanical pulling stress on a cable to which the connector is attached.

According to various embodiments, a method of cleaning a swimming pool comprises, in any order, (i) connecting a first component of an electrical connector to a source of electrical power, (ii) connecting the first component to a second component of the electrical connector positioned on, at, in, or near a body of an APC, and (iii) placing the APC in the swimming pool.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION OF THE INVENTION

Figure 1:
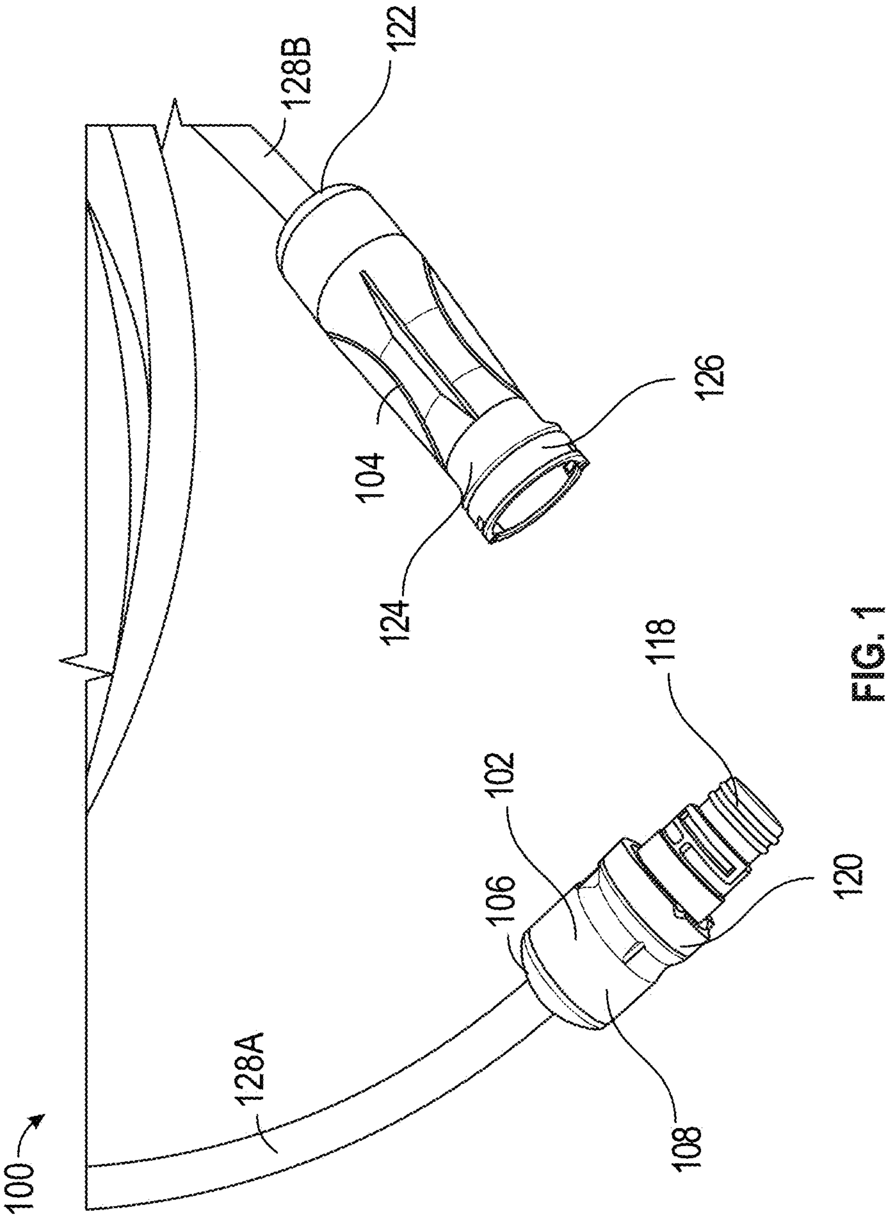
FIG. 1 illustrates an electrical connector assembly for an APC including a first component and a second component according to embodiments.

Described herein are robotic and other electrically powered APCs in which electrical-supply connectors are positioned on, at, in, or near bodies of the APCs. If such a connector is separable, essentially the entirety of the electrical cable may be separated from the APC for purposes of untangling or storing the cable, as examples. The separation additionally may allow for insertion of one or more extension cables as needed or desired.

As noted above in connection with the Brown patent, existing connectors typically are positioned at or near power and data supplies (e.g. "e-boxes") themselves positioned externally of pools. This connector positioning historically avoids frequent submerging of the connector, reducing the risk of electrical malfunction or damage due to water intrusion. It also reduces the likelihood of the connector suffering mechanical damage should a consumer pull on the electrical cord to remove an APC from a pool, as often occurs. Consequently, the skilled person would not consider it obvious to position the connector on, at, in, or near the APC, as doing so would be contrary to these risk-reduction objectives.

Nevertheless, the present invention contemplates placing an electric connector on, at, in, or near a body of an APC. Connectors of the present invention thus should have good waterproofing characteristics and mechanical strengths, as they will be subject to immersion in pool water while the APCs are operating and pulling stresses should the APCs be removed from pools using the electrical cables. The connectors also should comprise at least two parts, one that remains on, at, in, or near a body of an APC and another part that is separable therefrom. If desired, the connectors further may be configured so that one part may rotate, or otherwise swivel, relative to the other.

In some versions of the invention, the electrical connector is designed to be positioned approximately twenty to thirty centimeters (20-30 cm) from the body of the automatic cleaner. In some other versions, the connector is designed so that a first portion attaches directly to the APC body and a second portion attaches to the first portion. In yet other versions, one portion may be located predominantly or completely within an APC body, with the other portion connectable thereto while remaining partially or completely outside the body. Persons skilled in the relevant art will recognize that other manners of positioning electrical connectors on, at, in, or near bodies of APCs alternatively may be employed. Because most, if not essentially all, of the length of the electrical cable may be disconnected from the APC, the cable desirably may be disconnected by a user in order to untangle or store it, as examples. In certain embodiments, the electrical connector may be removable from the APC without a separate tool, and the electrical connector may be considered a "tool-less connector" enabling manual removal or disconnection from the APC (and conversely manual or tool-less attachment to the APC).

Each connector advantageously comprises a male (or first) and a female (or second) component that may engage both mechanically and electrically. In various embodiments, the components of the electrical connector may be disconnected and/or connected manually and without requiring a separate tool. In some embodiments, the components themselves may be opened and/or assembled without requiring a separate tool (e.g., the male component may be opened and/or assembled without requiring a separate tool and may be performed manually). Each connector beneficially allows transmission of electrical power to an APC and data either to or from the APC (or both to and from the APC). Skilled persons will, however, recognize that the present invention encompasses connectors other than, or in addition to, those shown in the accompanying figures. Various other benefits and advantages may be realized with the systems and methods provided herein, and the aforementioned advantages should not be considered limiting.

FIG. 1 illustrates an example of an electrical connector assembly 100 for an APC according to various embodiments. In various embodiments, the electrical connector assembly 100 includes a first connector (or component) 102 and a second connector (or component) 104. As discussed in detail below, in certain embodiments, one of the connectors (e.g., the first connector 102) may be placed on, at, in, or near a body of the APC, and the other connector (e.g., the second connector 104) may be separable therefrom. In various embodiments, the first connector 102 on, at, in, or near the body of the APC may further be detachable from the APC as desired using various devices or mechanisms as desired. In some embodiments, the first connector 102 may be manually detachable from the APC without requiring a separate tool.

The connectors 102, 104 may be various suitable types of connectors for mechanical and electrical engagement. In the embodiment illustrated in FIG. 1, the first connector 102 is a male connector and the second connector 104 is a female connector. In various embodiments, the connectors 102, 104 facilitate transmission of electrical power to the APC and/or data transmission to and/or from the APC.

Figure 2:
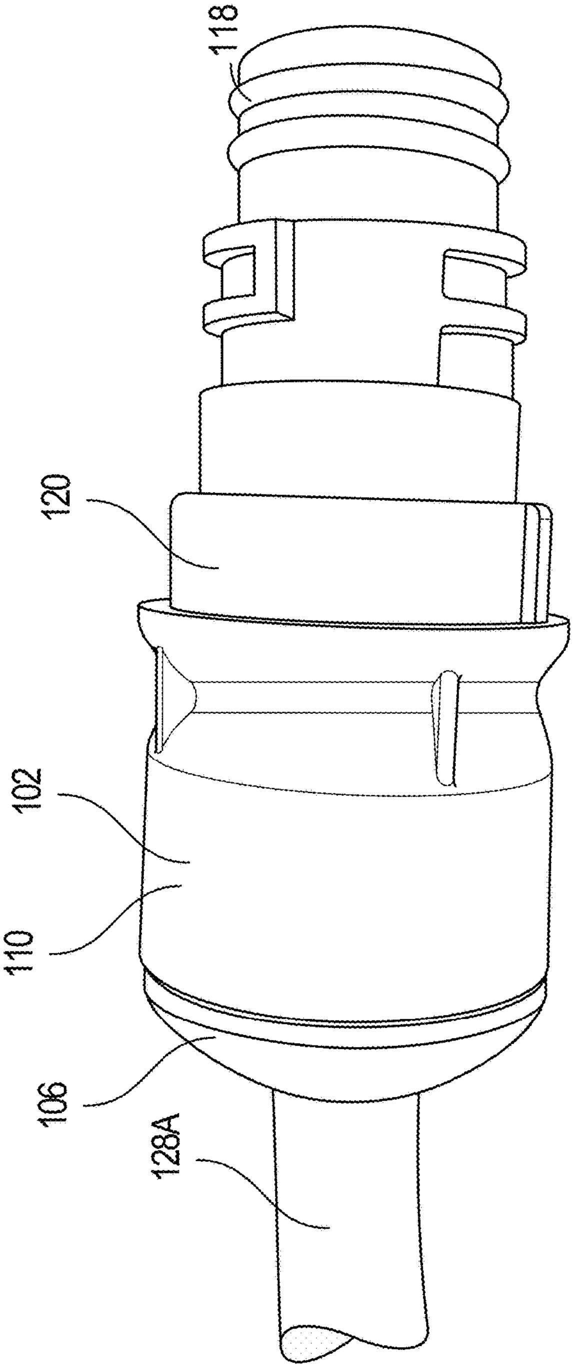
FIG. 2 illustrates the first component of the electrical connector assembly of FIG. 1.
Figure 3:
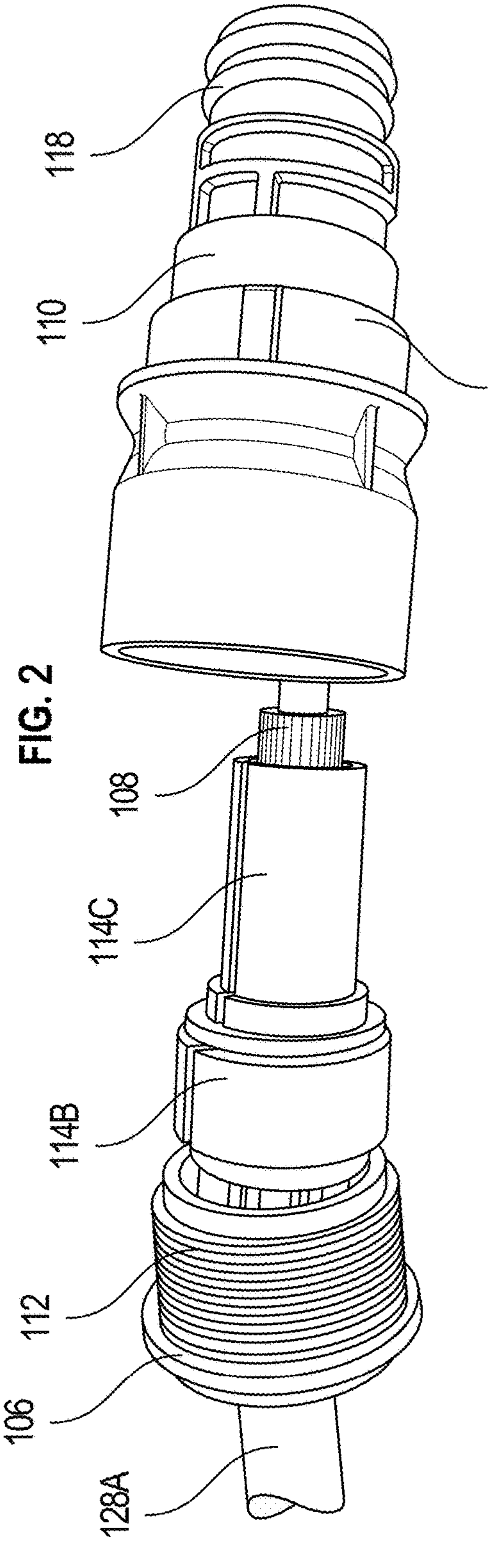
FIG. 3 illustrates the first component of the electrical connector assembly of FIG. 1 with a cover removed.

Referring to FIGS. 1-6, the first connector 102 generally includes a base 106, a connecting component 108, and a cover 110. Optionally, the first connector 102 may be assembled and/or opened without requiring a separate tool. The cover 110 is connectable with the base 106 such that the connecting component 108 is housed between the base 106 and the cover 110. The base 106 may include various engagement features 112 enabling connection between the cover 110 and the base 106. In the present embodiment and as best illustrated in FIGS. 2 and 3, the engagement feature 112 includes threading on the base 106, and the cover is threadably coupled to the base 106. In certain embodiments, the base 106 is constructed from a flexible and/or other suitable material that engages the cover 110 while also forming a waterproof or watertight seal based on such engagement.

Figure 4:
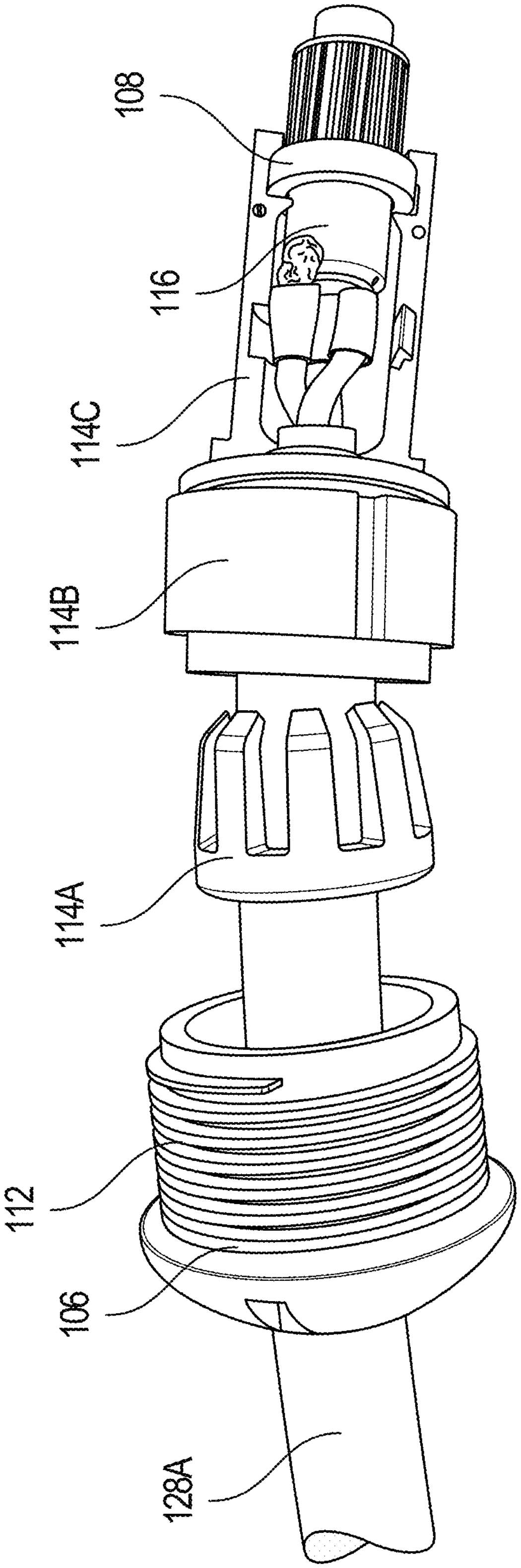
FIG. 4 is another view of the first component of the electrical connector assembly of FIG. 1 with the cover removed.
Figure 5:
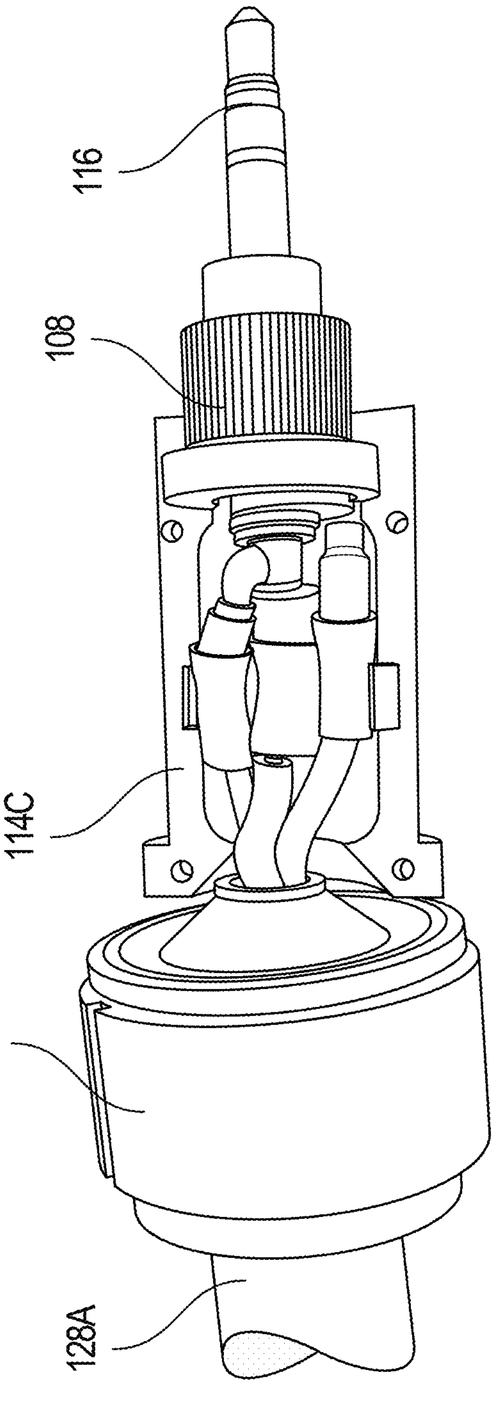
FIG. 5 is another view of the first component of the electrical connector assembly of FIG. 1 with a cover removed and with a connecting component rotated to extend outwards from the first component.
Figure 6:
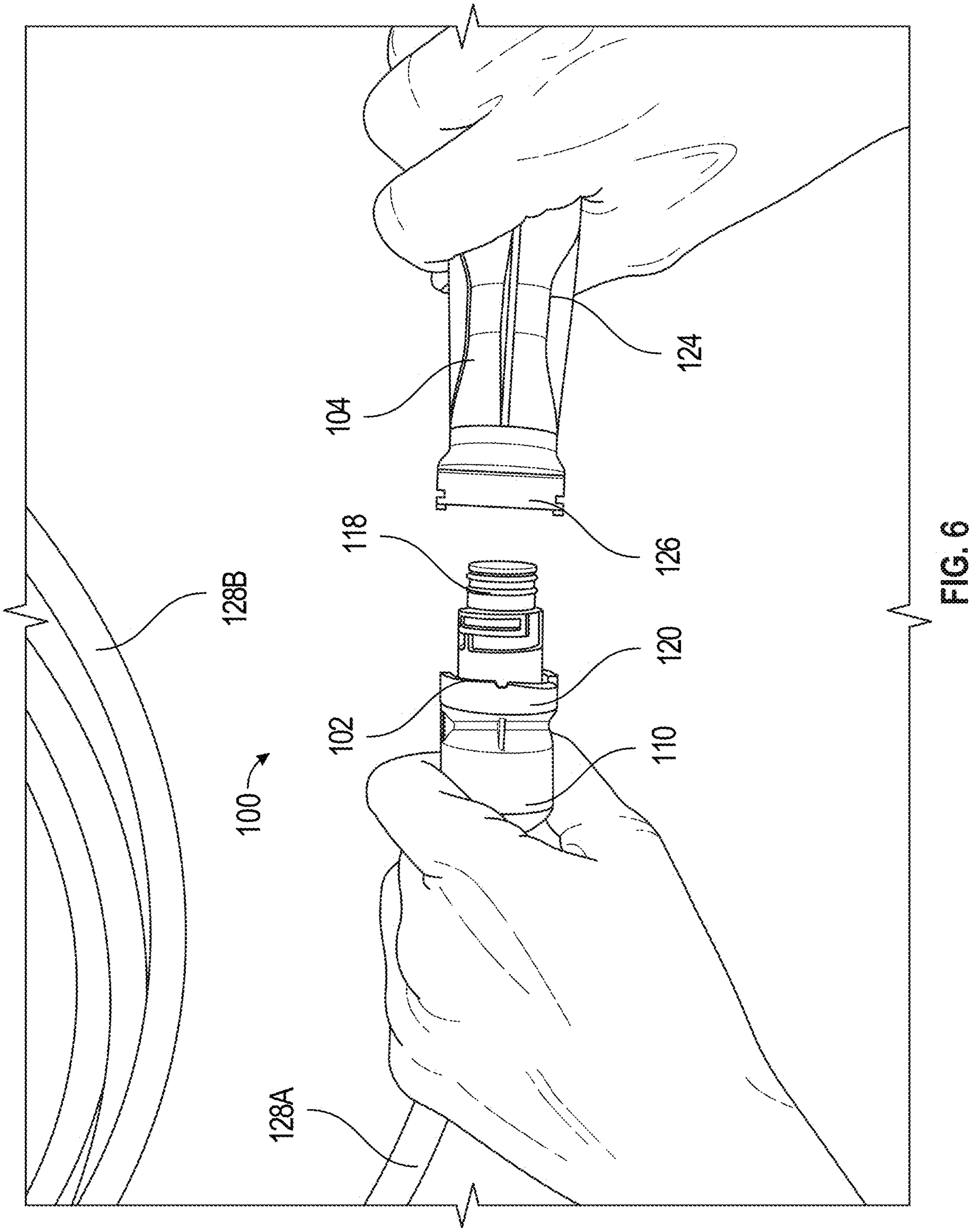
FIG. 6 illustrates the electrical connector assembly of FIG. 1 with the first mating component being connected to the first mating component.

As best illustrated in FIGS. 3-5, one or more members 114 may be provided on and/or adjacent to the connecting component 108 for positioning the connecting component 108 relative to the base 106 and the cover 110. In some embodiments, one or more members 114 may provide a seal based on such engagement. In the embodiment illustrated, the first connector 102 includes members 114A-B that position the connecting component 108 relative to the base 106 while also forming a seal between the base 106 and the connecting component 108. In certain embodiments, the member 114B may further contact and form a seal with the cover 110 when positioned within the cover 110. A member 114C is illustrated as at least partially surrounding the connecting component 108. In this embodiment, the member 114C may optionally engage the cover 110 and further form a seal with the cover 110. In various embodiments, the first connector 102 may be sealed when the first connector 102 is connected to the second connector 104 and when the first connector 102 is disconnected from the second connector 104.

Optionally, and as best illustrated in FIGS. 4 and 5, a portion of the connector 102 may be configured to rotate, swivel, or otherwise be adjusted relative to another portion of the connector. In the embodiment illustrated, the connecting component 108 includes a coupler 116 that is rotatably supported on the connecting component 108 such that rotation causes movement of the coupler 116 from a stowed position (FIG. 4) to a deployed position (FIG. 5), or vice versa. In this embodiment, the swiveling or rotating coupler 116 may allow for the coupler 116 to be more securely stored when not in use to minimize or reduce potential damage. The swiveling or rotating coupler 116 or other component of the connector 102 may provide other benefits and advantages as desired. As a non-limiting example, the swiveling or rotating portion of the connector 102 may allow for the connector 102 to remain coupled to the connector 104 as the APC moves during cleaning.

The cover 110 of the connector 102 may include features (e.g., locking features, grooves, ribs, threading, etc.) for engaging the connector 104. In certain embodiments, the features may provide a sufficient engagement with the connector 104 such that the connectors remain coupled or engaged when subjected to pulling stresses (e.g., if the APCs are removed from pools by pulling on or using the electrical cabling 128A-B). The cover 110 may also include one or more internal sealing members 118 and/or one or more external sealing members 120 for forming a seal with the connector 104 when the connectors 102, 104 are coupled.

The second connector 104 may include features similar to the first connector 102 such as a base 122, a coupling component, and a cover 124. Similar to the first connector 102, the second connector 104 optionally may be assembled and/or opened manually and without requiring a separate tool. As mentioned, the second connector 104 may be complimentary to the first connector 102 such that the connectors 102, 104 may be selectively coupled together. In certain embodiments, the first connector 102 and the second connector 104 may be connected and/or disconnected manually and without requiring a separate tool. Similar to the cover 110, the cover 124 may include one or more internal sealing members and/or external sealing members 126 for forming a seal with the connector 104. In the embodiment illustrated, the sealing member 126 may engage the sealing member 120 for forming a waterproof or watertight seal.

The covers 110, 124, sealing members, and other components of the connectors 102, 104 may provide the electrical connector assembly 100 with good waterproofing characteristics and mechanical strengths. In certain embodiments, the features of the connectors 102, 104 allow for the connectors 102, 104 to be subject to immersion in pool water while the APCs are operating and/or pulling stresses should the APCs be removed from pools using the electrical cables. In various embodiments, the connectors 102, 104 may be sealed both when the connectors 102, 104 are connected as well as when the connectors 102, 104 are disconnected.

In certain embodiments, the connectors 102, 104 are provided on conduit, wiring, and/or other cabling 128A-B for electrical (powering and/or data) transmission. However, in other embodiments, the connector(s) on, at, in, or near the body of the APC need not necessarily include cabling 128A depending on the positioning of the connector on, at, in, or near the body of the APC. As non-limiting examples, in some embodiments, the electrical connector 102 is designed to be positioned a distance from the body of the APC (i.e., the connector 102 is not directly connected to the APC and is connected to the APC via the cabling 128A). In one non-limiting example, the distance from the body may be predetermined. As a non-limiting example, the distance may be approximately twenty to thirty centimeters (20-30 cm) from the body of the APC. In some other versions, the connector is designed so that a first portion attaches directly to the APC body and a second portion attaches to the first portion. —In yet other versions, one portion may be located predominantly or completely within an APC body, with the other portion connectable thereto while remaining partially or completely outside the body.

Figure 7:
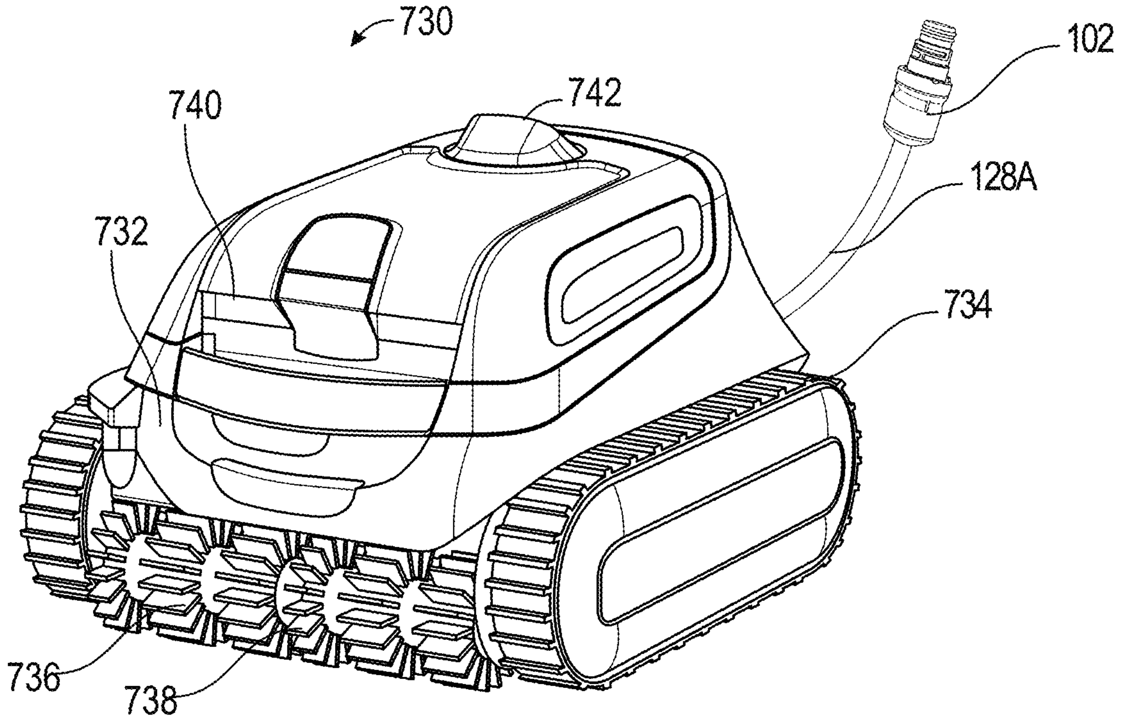
FIG. 7 illustrates an APC with a portion of the electrical connector assembly of FIG. 1.

FIG. 7 illustrates an example of an APC 730 with a portion of the electrical connector assembly 100. The APC 730 may be various types of APCs as desired, including robotic and hydraulic APCs, which may be suitable for use with a pool. The APC 730 generally includes a body 732, motive elements 734, and one or more cleaning elements 736. The motive elements 734 may be various suitable devices or structures suitable for enabling movement of the APC 730 along a surface, including but not limited to wheels, rollers, feet, tracks, combinations thereof, and/or other suitable motive elements 734 as desired. The cleaning element 736 may be suitable devices for cleaning a surface and/or directing debris into the APC 730 and/or towards a filter of the APC 730, including but not limited to a brush assembly 738 with one or more brushes. The APC 730 may additionally or alternatively include one or more of a pump, a debris filter, a rechargeable, on-board battery (or other suitable power source), and/or one or more motors for operating the pump and motive elements. A cover 740 optionally may be coupled to the body 732 to selectively provide access to or limit access to internal components of the APC 730. In certain embodiments, the body 732 and/or the cover 740 of APC 730 may include at least one inlet for debris-laden water of the pool and at least one outlet 743 for filtered water to be exhausted back into the pool.

As illustrated in FIG. 7, the cabling 128A extends from the APC 730 such that the connector 102 is a distance away from the body 732 of the APC 730 and/or the connector 102 is connected to the APC 730 via the cabling 128A. In some embodiments, the distance may be a distance where the connector 102 is submerged within the water of the pool when the APC 730 is submerged. As a non-limiting example, the distance may be approximately twenty to thirty centimeters (20-30 cm) from the body 732 of the APC 730. In other embodiments, the distance may be other distances as desired. Moreover, in other embodiments, the connector 102 may be provided at other locations on, at, in, or near the body 732 of the APC 730. As non-limiting examples, the connector 102 may be directly on the body 732, within the body 732 and extending partially through the body 732, completely within the body 732, on the cover 742, a distance from the cover 742, and/or other locations as desired. In certain embodiments, the distance that the connector 102 is provided relative to the body 732 may be adjustable using various suitable devices or mechanisms.

The connector 102 provided on, at, in, or near the body 732 of the APC 730 allows for most, if not essentially all, of the length of the electrical conduit to be disconnected from the APC 730 (e.g., for untangling, storage, etc.). The connector 104 separable from the connector 102 provided on, at, in, or near the body 732 of the APC 730 may also allow for insertion of one or more extension cables as needed or desired. Moreover, at an end opposite from the end with the connector 104, the cabling 128B may include a connector similar to the connector 102 and/or as otherwise desired such that the cabling 128B may be connected to or separated from a control box side or source of power as desired. Various other benefits and advantages may be realized with the systems and methods provided herein, and the aforementioned advantages should not be considered limiting.

Exemplary concepts or combinations of features of the invention may include:

A. An electrical connector positioned on, at, in, or near a body of an APC, the electrical connector separable from the APC without a tool.
B. The electrical connector according to statement A, further comprising a base, a cover engaged with the base, and a connecting component housed by the base and the cover.
C. The electrical connector according to statement A or B, wherein the connecting component comprises a coupler rotatably supported on the connecting component such that the coupler is movable between a stowed position and a deployed position.
D. The electrical connector according to any one of statements A-C, wherein the connecting component is sealed within the base and the cover, and, optionally, wherein the electrical connector is sealed when the electrical connector is connected to the APC or disconnected from the APC.
E. The electrical connector according to any one of statements A-D, wherein the electrical connector is submergible in water.
F. An APC including a body and an electrical connector positioned on, at, in, or near the body.
G. The APC according to statement F wherein the electrical connector is positioned on the body.
H. The APC according to statement F or G, wherein the electrical connector is a distance from the body such that the electrical connector is submergible with the APC.
I. The APC according to any one of statements F-H, wherein the distance is 20-30 cm.
J. The APC according to any one of statements F-I, wherein the electrical connector comprises a base, a cover engaged with the base, and a connecting component housed by the base and the cover, wherein the connecting component is at least partially sealed by the base and the cover.
K. A cable assembly for an APC including an electrical connector positioned on, at, in, or near a body of the APC.
L. An electrical connector for a robotic APC configured to (i) be submerged in use and (ii) withstand mechanical pulling stress on a cable to which the connector is attached.
M. A method of cleaning a swimming pool comprising, in any order, (i) connecting a first component of an electrical connector to a source of electrical power, (ii) connecting the first component to a second component of the electrical connector positioned on, at, in, or near a body of an APC, and (iii) placing the APC in the swimming pool.
N. The method according to statement M, further comprising submerging the first electrical connector and the second electrical connector within water of the swimming pool.
O. The method according to statement M or N, further comprising disconnecting the first electrical connector from the second electrical connector and storing the APC with the second electrical connector.
P. An electrical connector assembly for an automatic swimming pool cleaner (APC) comprising an electrical connector positioned on, at, in, or near a body of the APC.
Q. The electrical connector assembly according to statement P, wherein the electrical connector is a first connector, and wherein the electrical connector assembly further comprises a second connector separable from the first connector and configured to mechanically and electrically engage the first connector.
R. The electrical connector assembly according to statement P or Q, wherein the electrical connector assembly is configured to be submerged within water of a pool or spa.
S. The electrical connector assembly according to any one of statements P-R, wherein the electrical connector is on the body of the APC.
T. The electrical connector assembly according to any one of statements P-S, wherein the electrical connector is a distance from the body of the APC such that the electrical connector is configured to be submerged within water of a pool or spa with the APC.
U. The electrical connector assembly according to any one of statements P-T, wherein the electrical connector assembly is configured to (i) be submerged in use and (ii) withstand mechanical pulling stress on a cable to which the electrical connector is attached.
V. A connector as illustrated in any of the accompanying figures.
W. An electrical connector positioned on, at, in, or near a body of an APC.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Further, although applicant has described devices and techniques for use principally with APCs, persons skilled in the relevant field will recognize that the present invention conceivably could be employed in connection with other objects and in other manners. Finally, references to "pools" and "swimming pools" herein may also refer to spas or other water containing vessels used for recreation or therapy and for which cleaning of debris is needed or desired.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements. As used herein, the meaning of "a," "an," and "the" includes singular and plural references unless the context clearly dictates otherwise.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. An electrical connector assembly comprising an electrical connector positioned on, at, in, or near a body of an automatic swimming pool cleaner (APC), the electrical connector separable from the APC without a tool, wherein the electrical connector further comprises a base, a cover engaged with the base, and a connecting component housed within the base and the cover, and wherein the connecting component comprises a coupler supported on the connecting component and rotatable relative the connecting component such that the coupler is movable between a stowed position and a deployed position.

2. The electrical connector of claim 1, wherein the connecting component is sealed within the base and the cover, wherein the electrical connector is sealed when the electrical connector is connected to the APC or disconnected from the APC.

3. The electrical connector of claim 1, wherein the electrical connector is submergible in water.

4. An automatic swimming pool cleaner (APC) comprising a body and an electrical connector positioned on, at, in, or near the body, wherein the electrical connector comprises a connecting component and a coupler, wherein the coupler is supported on the connecting component and rotatable relative the connecting component such that rotation of the coupler causes axial movement of the coupler between a stowed position and a deployed position.

5. The APC of claim 4, wherein the electrical connector is positioned on the body.

6. The APC of claim 4, wherein the electrical connector is a distance from the body such that the electrical connector is submergible with the APC.

7. The APC of claim 6, wherein the distance is 20-30 cm.

8. The APC of claim 4, wherein the electrical connector comprises a base and a cover engaged with the base, wherein the connecting component is housed by the base and the cover, wherein the connecting component is at least partially sealed by the base and the cover.

9. An electrical connector assembly for an automatic swimming pool cleaner (APC) comprising an electrical connector positioned on, at, in, or near a body of the APC, wherein the electrical connector is configured to swivel, wherein the electrical connector comprises a connecting component and a coupler, the coupler supported on the connecting component and rotatable relative the connecting component such that the coupler is axially movable between a stowed position and a deployed position based on rotation of the coupler.

10. The electrical connector assembly of claim 9, wherein the electrical connector is a first connector, and wherein the electrical connector assembly further comprises a second connector separable from the first connector and configured to mechanically and electrically engage the first connector.

11. The electrical connector assembly of claim 10, wherein the electrical connector assembly is configured to be submerged within water of a pool or spa.

12. The electrical connector assembly of claim 9, wherein the electrical connector is on the body of the APC.

13. The electrical connector assembly of claim 9, wherein the electrical connector is a distance from the body of the APC such that the electrical connector is configured to be submerged within water of a pool or spa with the APC.

14. The electrical connector assembly of claim 9, wherein the electrical connector assembly is configured to (i) be submerged in use and (ii) withstand mechanical pulling stress on a cable to which the electrical connector is attached.

15. A method of cleaning a swimming pool with an automatic swimming pool cleaner (APC) comprising, in any order, (i) connecting a first electrical connector of an electrical connector assembly to a source of electrical power, (ii) connecting the first electrical connector to a second electrical connector of the electrical connector assembly positioned on, at, in, or near a body of an APC, at least by rotating a coupler on and relative to a connecting component of the second electrical connector, wherein the first connector and the second connector are configured to swivel while connected, wherein rotating the coupler axially moves the coupler from a stowed position to a deployed position, and (iii) placing a body of the APC in the swimming pool.

16. The method of claim 15, further comprising, after (i)-(iii) submerging the first electrical connector and the second electrical connector within water of the swimming pool.

17. The method of claim 15, further comprising, after (i)-(iii) disconnecting the first electrical connector from the second electrical connector and storing the APC with the second electrical connector.

* * * * *